(12) United States Patent
Moreno et al.

(10) Patent No.: US 6,731,192 B1
(45) Date of Patent: May 4, 2004

(54) SOLENOID COIL POSITIONING ASSEMBLY AND METHOD

(75) Inventors: Alejandro Moreno, El Paso, TX (US); Omar Rocha, Juarez (MX)

(73) Assignee: Delphi Technologies, Inc., Troy, MI (US)

( * ) Notice: Subject to any disclaimer, the term of this patent is extended or adjusted under 35 U.S.C. 154(b) by 64 days.

(21) Appl. No.: 09/706,538

(22) Filed: Nov. 3, 2000

(51) Int. Cl.⁷ .................................................. H01F 3/00
(52) U.S. Cl. ..................... 335/256; 335/220; 251/129.15
(58) Field of Search ............................. 335/256, 262–3, 335/220–229, 276; 251/129.01–129.22; 303/119.2; 336/292, 298

(56) References Cited

U.S. PATENT DOCUMENTS

| | | | |
|---|---|---|---|
| 4,405,912 A | * 9/1983 | Palma et al. ................ 335/260 |
| 5,630,569 A | * 5/1997 | Oehler et al. ............ 251/129.15 |
| 5,823,507 A | 10/1998 | Inden et al. | |
| 5,845,672 A | 12/1998 | Reuter et al. | |
| 5,895,026 A | * 4/1999 | Linkner, Jr. et al. .... 251/129.15 |
| 6,000,679 A | 12/1999 | Reuter et al. | |

* cited by examiner

Primary Examiner—Lincoln Donovan
(74) Attorney, Agent, or Firm—Jimmy L. Funke

(57) ABSTRACT

A solenoid coil assembly having a first component member that is configured to support a coil and has a pair of terminal pins. The terminal pins are positioned for attachment to a structure such as a circuit board or lead frame. The first component member has pins for ultrasonic staking to a second component member. The second component member covers the first component member and the first and second component members provide an area for receiving and mounting the solenoid coil assembly to a valve assembly. The solenoid coil assembly positions first component member including the coil about the valve assembly.

22 Claims, 5 Drawing Sheets

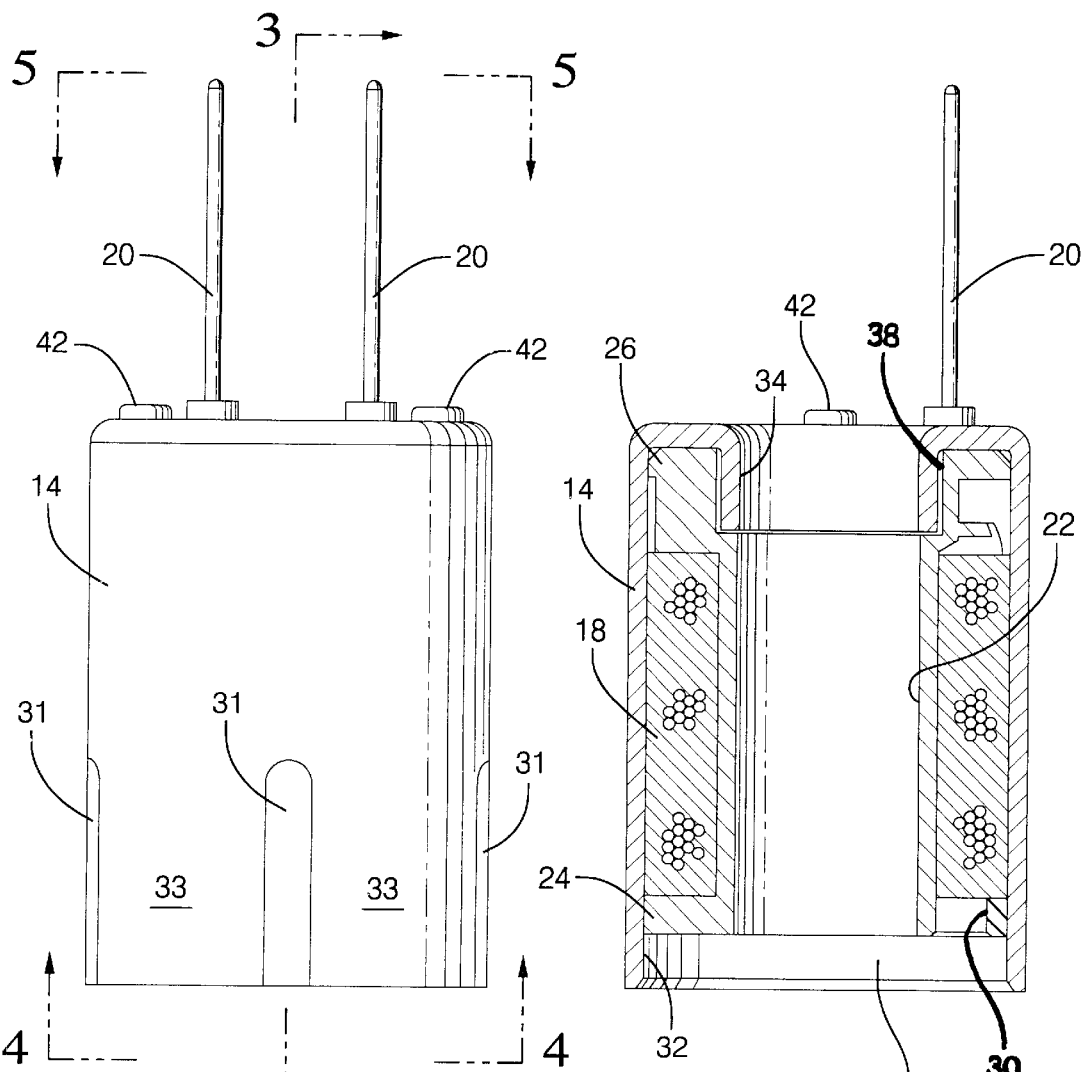
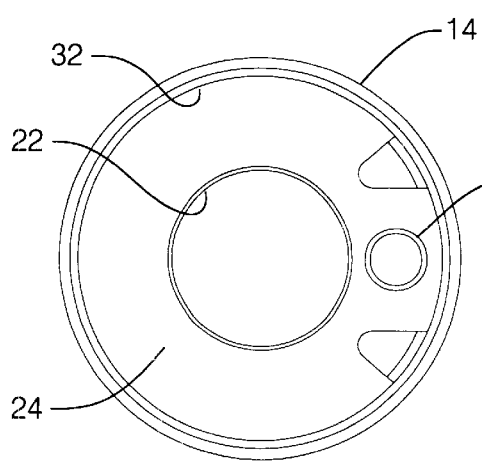
FIG. 2
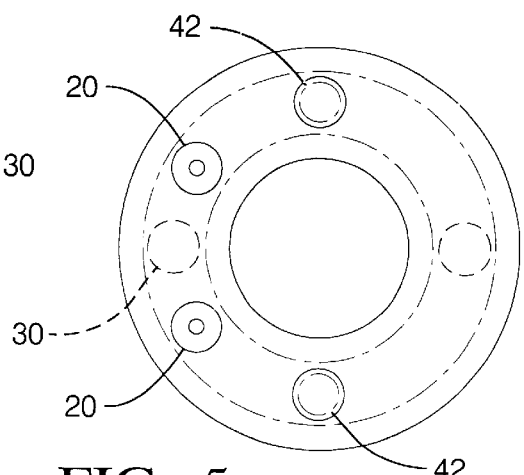
FIG. 3
FIG. 4
FIG. 5

SOLENOID COIL POSITIONING ASSEMBLY AND METHOD

TECHNICAL FIELD

The present invention relates to a solenoid coil assemblies and more particularly, to a design configuration and method for securing solenoid coils relative to corresponding valve assemblies.

BACKGROUND OF THE INVENTION

Solenoid actuated valves are manipulated in response to an electromagnetic force of the solenoid coil. The electromagnetic force positions movable valve elements in various manners. An integral part of these devices are the air gaps provided in the electromagnetic circuit of the solenoid. A primary (working), air gap is generally provided between the movable armature and a first non-moving ferromagnetic element. The first non-moving ferromagnetic element generally comprises an integral part of the associated valve's structure. Secondary (parasitic) air gaps are generally provided between the movable armature and other non-moving ferromagnetic elements. The other non-moving ferromagnetic elements generally comprise integral parts of the actuator. When the solenoid is energized, the coil establishes magnetic flux in the ferromagnetic elements which traverses all the air gaps. The size of the air gaps is an important factor in determining the operational characteristics of the device.

Variations in the magnetic flux transfer properties of solenoid actuated valves may be particularly intolerable depending upon the nature of the application within which the device operates. Efficient designs must prevent magnetic flux losses created by undesirable conditions such as inordinately large secondary air gaps.

In some applications a solenoid actuator may be incorporated with a control mechanism by directly attaching the solenoid's coil terminal pins to a circuit board. In this type of device, the solenoid actuated valve comprises two subassemblies. One subassembly carries the actuator's coil with its terminals soldered to the control circuit board. The other subassembly carries the valve body. When the two subassemblies are mated together, some facility is generally provided for allowing the coil to move relative to its subassembly and into position for receipt onto the valve body. However, since the coil is preferably soldered to the circuit board prior to mating of the two subassemblies, connection of the coil and valve body may undesirably stress the soldered connections between the coil's terminal pins and the circuit board due to, for example, slight mislocations of the positioning of both subassemblies from normal manufacturing tolerances.

Provisions that allow movement of the coil for assembly purposes may also become undesirable when the solenoid actuated valve is placed in service. Coil movement may be induced by vibratory conditions that exist in the solenoid actuated valve's operating environment. Vibration induced coil movement also transfers loads to the soldered terminal pin connection.

Therefore, a solenoid actuated valve's design should prevent this condition from occurring. Accordingly, a solenoid actuated valve design is required that: provides ease of assembly and disassembly, exhibits good magnetic flux transfer characteristics, and is able to withstand harsh vibratory environments.

SUMMARY OF THE INVENTION

It is a goal of the present invention to provide a solenoid actuated valve that: is constructed from two subassemblies that are easily assembled and disassembled, exhibits good magnetic flux transfer characteristics, and is able to withstand harsh vibratory environments. In accordance with this goal, a solenoid actuated valve is provided that is designed according to concepts that are equally applicable to normally closed valves, normally open valves, multi-function valves, and other typical related types of valves. The solenoid actuated valve includes a first subassembly that carries a coil having its terminal pins attached to a structure such as a circuit board or rigid lead frame. A second subassembly is provided for mating with the first subassembly. The first and second subassemblies carry the valve body which may be further attached to a valve housing utilized for directing the flow of hydraulic fluid.

In accordance with a preferred embodiment of the present invention, a first subassembly includes a solenoid spool including the coil and the second a case for surrounding the spool.

The above-described and other features and advantages of the present invention will be appreciated and understood by those skilled in the art from the following detailed description, drawings, and appended claims.

BRIEF DESCRIPTION OF THE DRAWINGS

FIG. 2 is a side view of the coil assembly;

FIG. 3 is a view along the lines 3—3 of the FIG. 2 embodiment;

FIG. 4 is a view along the lines 4—4 of the FIG. 3 embodiment;

FIG. 5 is a view along the lines 5—5 of the FIG. 3 embodiment;

DETAILED DESCRIPTION OF THE PREFERRED EMBODIMENT

Figure 1:
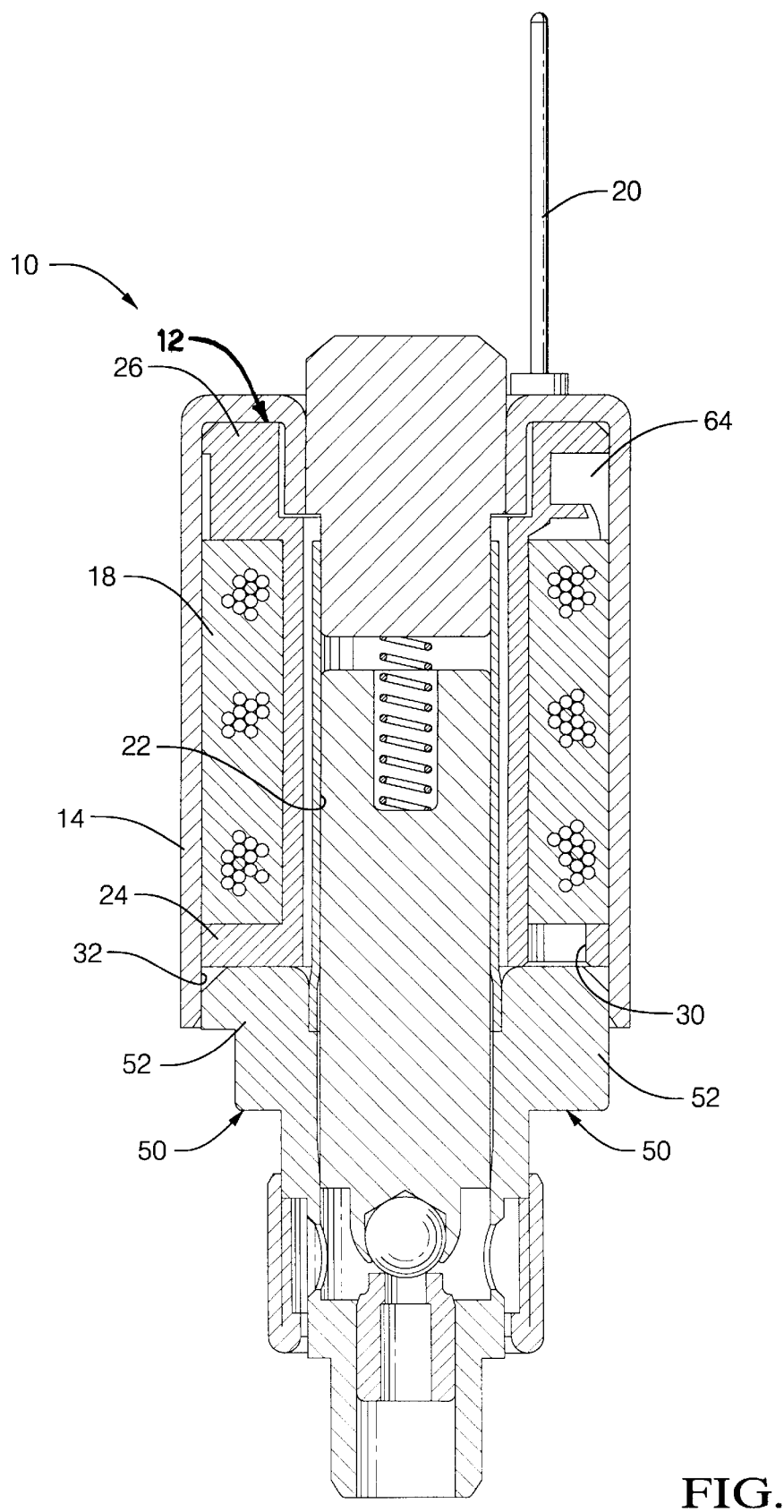
FIG. 1 is a cross-sectional view of the coil assembly secured to a valve assembly.

Referring now to FIGS. 1–7, a coil assembly 10 constructed in accordance with the present invention is illustrated. Assembly 10 has a spool assembly 12 and an outer case 14. Spool assembly 12 is configured and dimensioned to be received and engaged within outer case 14. The spool in spool assembly 12 is constructed out of a durable, light-weight, nonconductive, easily molded material such as plastic. The outer case 14 is constructed out of a ferromagnetic material, which helps to align and direct the magnetic flux generated by assembly 10. In an exemplary embodiment, the spool in spool assembly 12 is configured to receive a winding or coil of wire 18. Coil 18 generates a magnetic flux when a current is passed through it. A pair of terminals 20 for securement to a circuit board (not shown) are secured to spool assembly 12 and winding 18.

Spool assembly 12 is configured to have an inner through opening 22 for receiving and engaging a portion of a valve assembly to which coil assembly 10 is mounted. Spool assembly 12 has a spool assembly guide end 24 and a spool assembly securement end 26. The configuration of the spool and ends 24 and 26 define a channel or receiving area 28 into which coil 18 is wound.

In addition, a guide opening 30 is positioned on spool assembly guide end 24. Guide opening 30 serves as a fastening feature to hold the spool in a turning apparatus which will rotate the spool to allow the wire to be wrapped around the spool winding bay creating a coil 18.

The outside diameter of spool assembly guide end 24 and securement end 26 are slightly smaller than the inside diameter of outer case 14. This allows spool assembly 12 to be inserted and engaged within case 14.

Case 14 has an opening 32 at one end and an opening 34 at the other. Opening 32 has an inside diameter that is slightly larger than the outside diameter of guide end 24 and securement end 26 of spool assembly 12.

In an exemplary embodiment, the sidewalls of opening 32 are chamfered to provide for ease of insertion of spool assembly 12 into case 14. Opening 34 of case 14 is smaller than opening 32 and similar in size to opening 22 of spool assembly 12. Therefore, spool assembly 12 must be inserted into case 14 through opening 32. Case 14 is configured to have an inner annular receiving area 36 defined by the outer walls of case 14 and the walls of opening 34. Inner annular receiving area 36 receives and engages securement end 26 of spool assembly 12 as it is inserted into case 14.

Securement end 24 has an engagement opening 38. Engagement opening 38 is slightly larger than inner opening 22 of spool assembly 12. Engagement opening 38 is large enough to accommodate opening 34 and the sidewalls of case 14 which define opening 34.

In an exemplary embodiment, securement end 26 is configured to have a pair of staking pins 42 which protrude outwardly from an engagement surface of securement end 26. Accordingly, and as securement end 26 is inserted into inner annular receiving area 36, staking pins 42 pass through a pair of openings 44 in case 14. In an exemplary embodiment, openings 44 are round, however, and as applications may require openings 44 may be of any configuration matching pins 42. The staking pins 42 protrude outwardly from securement end 26 a sufficient amount to allow staking pins 42 on spool to pass through case openings 44 and protrude outwardly from case 14 a sufficient amount to allow for the ultrasonic staking of pins 42 on spool assembly 12 to case 14. As illustrated by the dashed lines in FIG. 6 staking pins 42 have an initial un-staked configuration whereby the thickness of pin 42 is slightly smaller than the size of opening 44. Once pins 42 have been ultrasonically staked, the thickness of pins 42 is slightly larger than the size of opening 44 and the high of pin 42 is reduced. Accordingly, this allows spool assembly 16 to be fixedly secured to case 14. Of course, and as applications may require, the number of staking pins and their positions may vary.

As another alternative spool assembly 16 is inserted and secured to case 14 in a quick and efficient manner which provides a low cost and efficient manufacturing process for manufacturing coil assembly 10.

In an exemplary embodiment, where the outside diameter of securement end 26 is configured to have a raised engagement surface 46 for frictionally engaging the inner surface of case 14, a portion of raised engagement surface 46 can be configured to facilitate the insertion of spool assembly 12 within outer case 14.

Once spool assembly 16 is fully inserted within case 14, and staking pins 42 protrude through case openings 44, the spool assembly is secured to the case using ultrasonic staked pins. This allows spool assembly 16 to be inserted and secured to case 14 in a quick and efficient manner which provides a lower cost and more efficient manufacturing process for coil assembly 10.

In addition, and after spool assembly 16 is fully inserted into case 14 a receiving area 45 is defined by guide end 24 and the outer walls of case 14. Receiving area 45 is configured to receive a portion of a valve assembly (FIG. 1).

Figure 6:
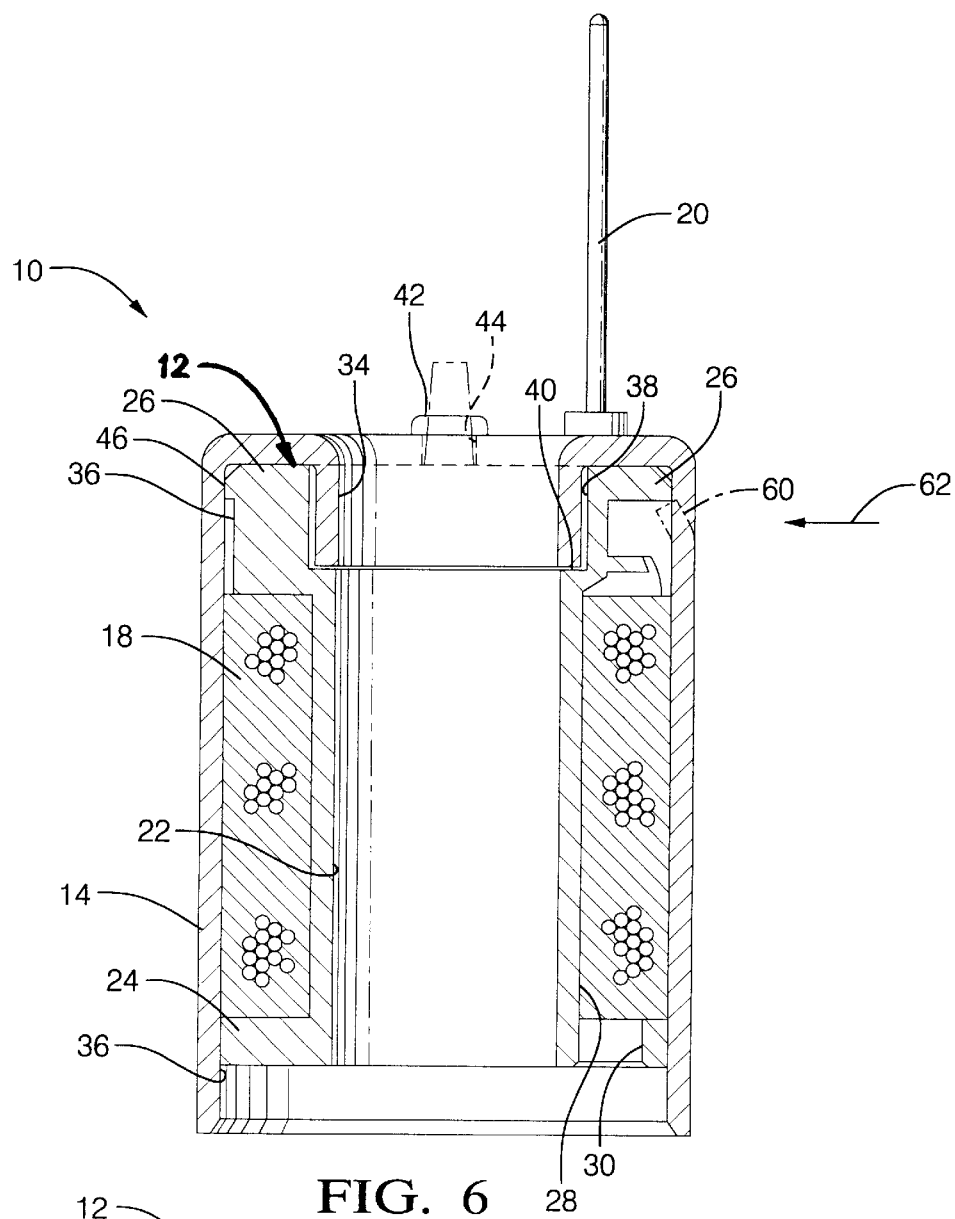
FIG. 6 is a cross-section a view of the coil assembly.

As an alternative, and referring now to the dashed lines in FIG. 6, case 14 is configured to have an interference case indentation 60, or a pair of indentations, which is biased generally in the direction of arrow 62. Accordingly, and as spool assembly 16 is inserted into opening 32, securement end 24 forces indentation and securement end 24 slides by interference indentation 60 until it has passed indentation 60 and indentation 60 is received within an opening 64 of spool assembly 12. Accordingly, indentation 60 provides for an interference fit of spool assembly 12 within case 14. As an alternative, stakes 42 may also be employed to secure spool assembly 12 within case 14.

Figure 7:
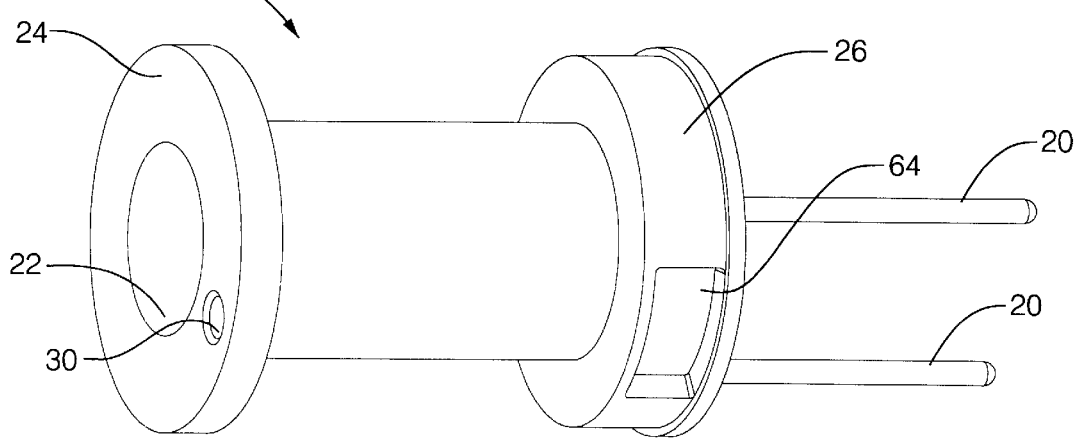
FIG. 7 is a perspective view of a spool assembly.
Figure 10:
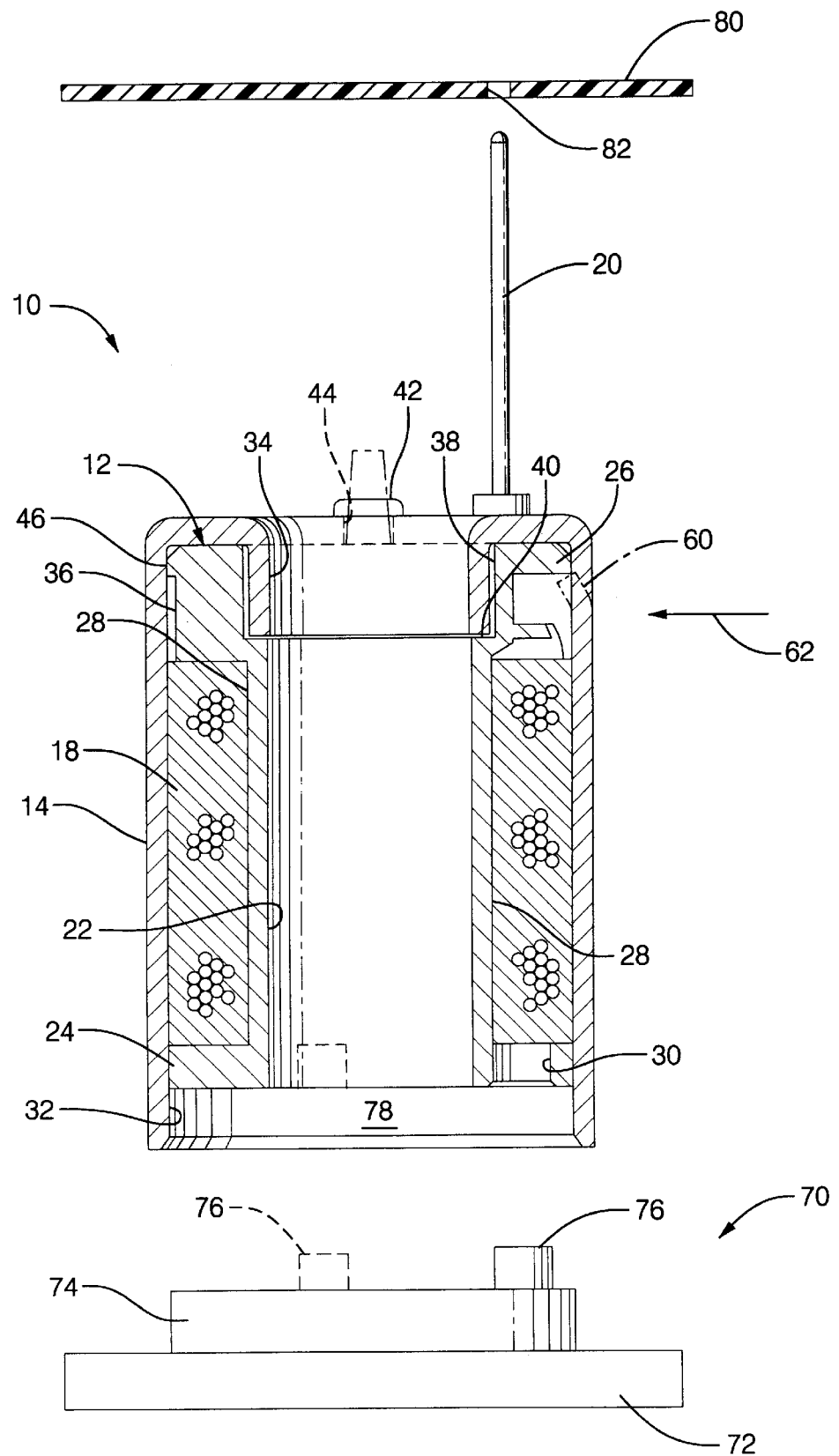
FIG. 10 is a side view of a fixture assembly and a portion of the coil assembly process.

Referring now in particular to FIGS. 5, 7 and 10 the positioning of guide hole 30 with respect to terminals 20 provides for an identification of the type of coil being used in the assembly process. Accordingly, and referring to the position of guide hole 30 with respect to terminals 20, an individual can quickly determine what type of coil is being inserted into outer case 14. For example, a guide hole positioned as in FIG. 5 will identify a type of coil assembly.

Referring now to FIG. 10, a fixture assembly 70 is illustrated. Fixture assembly 70 provides a supporting base for coil assembly 10. Fixture 70 has a coil supporting fixture base 72, a guiding diameter portion 74 and a guide hole pin 76.

Guiding diameter portion 74 is configured to have an outside diameter slightly smaller than the inside diameter of opening 32 of case 14. Guide hole pin 76 is positioned on the outer surface of guiding diameter portion 74 and it is configured to have an outside diameter slightly smaller than the inside diameter of guide hole 32.

Accordingly, and during the assembly process of coil assembly 10, outer case 14 and guide hole 32 can be positioned over guiding diameter portion 74 and guide hole pin 76 respectively.

The configuration of coil assembly 10 provides a receiving area 78 within opening 32 of case 14. The volume of receiving area 78 is slightly larger than the outside configuration of guiding diameter portion 74. Therefore, and as coil assembly 10 is positioned over fixture 70 coil assembly 10 is supported by coil supporting fixture 72 and guiding diameter portion 74.

Fixture 70 supporting the coil assembly will be guided using the inner diameter of the case. Guide pin 76 will be protruding from this fixture and is located so that the guide hole on the spool assembly falls over the pin thus fixing its positioned angularly relative to the center axis of the coil.

This will fixedly positioning coil assembly 10 with respect to a coil board or circuit board 80 having apertures 82 into which the terminals of the coil assembly enter and are wave soldered to.

Figure 11:
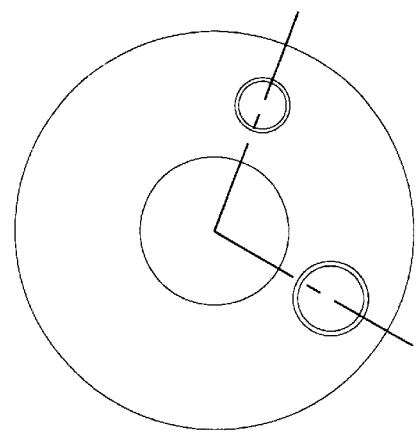
FIG. 11 is an end view of an alternative embodiment.

The fixtures are made using the angular position of the guide hole relative to the two protruding terminals. (FIGS. 4, 5 and 11) Therefore, when the coil assembly is placed on a bottom fixture which orients the coil using the guide hole, if the incorrect coil assembly is being inserted the resulting position of the terminals will not coincide with the correct terminal hole position on the circuit board. Therefore, the type of coil assembly will be easily identifiable and the manufacturer will be able to identify if the correct coil assembly has been inserted.

As an alternative, and as illustrated by the dashed lines in FIGS. 5 and 10, another option is to place two guide holes on the spool with a specific and unique radial angular position. In addition, a pair of guide hole pins are positioned on the surface of guiding diameter portion 74. In this embodiment, the two pins on the fixture are designed to accept a specific coil assembly must have the same radial angular position as the coil guide holes.

In this embodiment, the coil assembly can be distinguished without any need to the coil board 80 as the coil assembly will not properly sit upon fixture 70.

In addition, and as an alternative, coil supporting fixture 72 is configured to have a plurality of guiding diameter portions 74 and guide our pin 76 for a receiving and supporting a plurality of coil assemblies for securement to a circuit board.

These configurations provide a more efficient manufacturing process for assembly 10.

Referring now in particular to FIG. 1, coil assembly 10 is shown to be secured to a valve assembly 50. Valve assembly 50 has a flange portion 52 which has an outside diameter slightly smaller than the inside diameter of opening 32 of case 14. Flange portion 52 is received and engaged within receiving area 45. As an alternative, the inside diameter of opening 32 can be configured to be slightly smaller than the outside diameter of flange 52 and case 14 is constructed out of a material having flexible characteristics such that opening 32 will accommodate flange 52 as it is inserted into opening 32. This configuration will provide for a contact frictional engagement between the inner surface of opening 32 and flange 52. As an alternative, the sidewalls of opening 32 are configured to have a smaller thickness so as to allow the sidewalls of opening 32 to flex outwardly as spool assembly 12 is inserted into case 14.

As yet another alternative, a plurality of slots 31 are located on case 14. The positioning of slots 31 define a plurality of case members 33 which will be able to cantilever outward as spool assembly 12 is inserted into case 14. In addition, case members 33 will also cantilever outward in response to the insertion of a flange portion of a valve assembly being inserted into opening 32.

Figure 9:
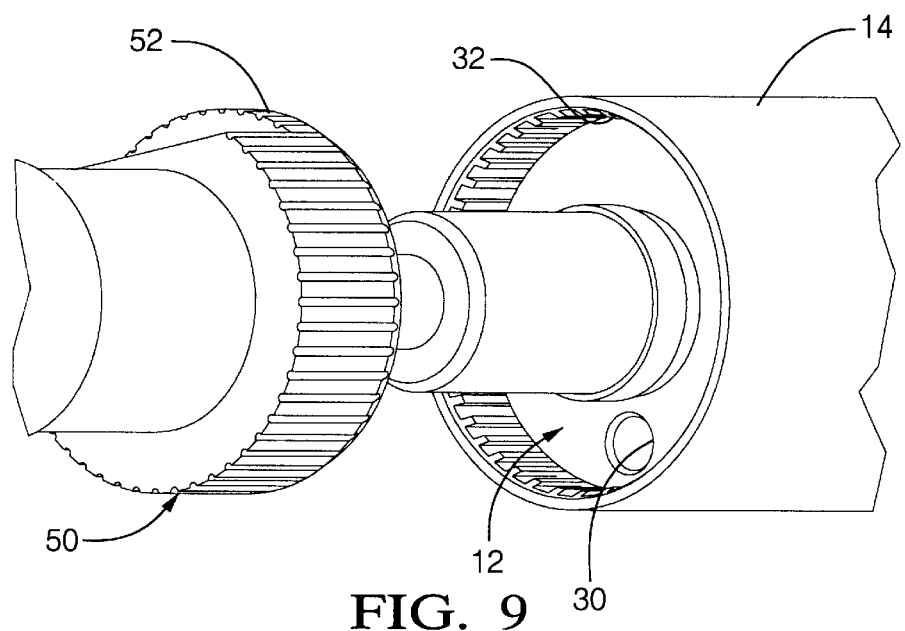
FIG. 9 is a perspective view of an alternative embodiment of the present invention.
Figure 8:
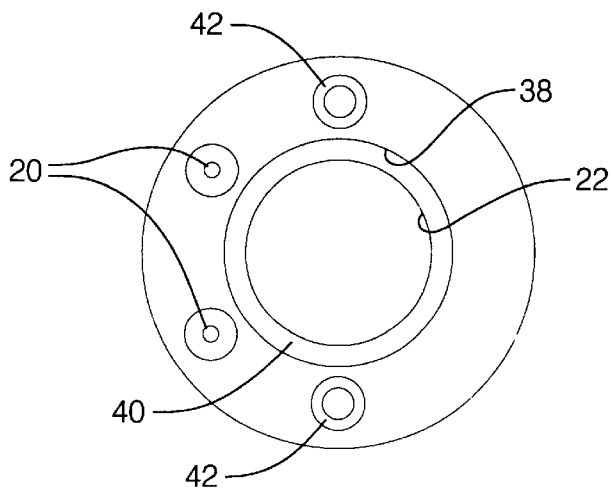
FIG. 8 is an end view of the coil assembly depicted in FIG. 7.

As yet another alternative, and referring now to FIG. 9, the inner surface of opening 32 is configured with a feature such as a plurality of grooves or indentations that will mate with a corresponding plurality of projections along the periphery of flange 52. Other alternate features can be slots and/or thin walls on case 14 at opening 32 to reduce the insertion forces required to push coil assembly over valve assembly flange portion 52.

Referring back now to FIG. 1, as coil assembly 10 is mounted to valve 50, the configuration of coil assembly 10 provides for a direct contact between the surface of flange 52 and the surface of guide end 24. In this position, the coil and magnetic flux generated thereby is positioned to affect the movement of a plunger within valve 50. In addition, the configuration of coil assembly 10 provides a rigid securement of valve assembly 50 to coil assembly 10.

Opening 64 also provides a means for securing terminals 20 to a winding of coil 18. This feature also allows the spool to have relatively uniform walls minimizing the amount of physical distortion on the part after it cools out of the mold.

The non-integral coil assembly to a valve of the instant application is a unique valve to coil interface that offers flexibility in modulator assembly for electronic control unit (ECU). In an exemplary embodiment, the ECU is comprised of, but not limited to, an electronic control circuit, housing, coil board or flex circuit, and coil assemblies to the hydraulic control unit (HCU). The HCU is comprised of, but not limited to, the hydraulic block, circuit, components, pump and valves, electrical and magnetic connections. The bottom portion of the coil magnetic circuit is enclosed with the valve of flange offering a more compact coil to valve assembly package. Each coil assembly is individually packaged so that it can be interchanged between the different types of valves in the HCU. The spool assembly is inserted into the case that covers all of the coil assembly magnetic circuit areas except for the bottom. The case is attached to the spool assembly using ultrasonic staking or interference fit to special indentations on the case. A hole in the spool flange and its angular relationship to the terminals is what identifies the type of coil in the modulator assembly and associated assembly processes.

The design of the coil assembly of the instant application allows for reduced actuator packaging, where the bottom portion of the magnetic circuit is integrated as part of the valve flange, the coil assembly is individually packaged and self-contained for interchangeability among valves and case to valve interface can be a slip fit, low interference, or interference depending on modulator assembly and/or serviceability requirements This design also reduces coil and actuator assembly package mass and volume. There is also cost reduction due to the reduction of components. There is also flexibility in the assembly of the coils as they are individually packaged for interchangeability with the modulator and can be adapted to various levels of assembly and disassembly scenarios.

The coil assembly of the instant application allows for slip to full press insertion forces to be applied for positioning the coil assembly over valves. Zero effort to non-disassemble conditions can be handles were serviceable and nonserviceable requirements must be met with magnetic and electrical ECU to HCU connections.

Since the coil is not integrated into the valve, high valve to modulator insertion forces can be applied without deleterious effects. This allows for accommodation of valve press to retain and or seal designs for a valve to modular assembly.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A solenoid coil assembly comprising:
   a) a spool assembly having a first end, a second end and a central opening, said first end having a guide opening and said second end being configured to receive and engage a pair of terminals;
   b) an outer case having a first opening and a second opening, said first opening being larger than said second opening and said second opening being configured to align with said central opening when said spool assembly is inserted into said first opening;
   c) an annular receiving area being positioned within said outer case and about said second opening, said annular receiving area receiving and engaging a portion of said second end of said spool assembly;

d) a coil wound about said spool intermediate said first and second ends, said coil being electrically connected to said terminals and is configured to receive an electrical current, wherein said guide opening of said spool assembly is positioned to receive a guide pin to properly locate said spool assembly on a coil supporting fixture adapted for inserting said pair of terminals into a circuit board having a pair of terminal openings, wherein said pair of terminals align with said pair of terminal openings when said guide pin is inserted into said guide opening;

e) a staking member positioned on an engagement surface of said second end of said spool assembly, said staking member being positioned and configured to pass through a corresponding opening in said outer case.

2. The solenoid coil assembly as in claim 1, further comprising:

f) an engagement opening being positioned on said second end of said spool assembly and being configured to receive a portion of said outer case.

3. The solenoid coil assembly as in claim 2, wherein said engagement opening includes an annular shoulder for receiving a portion of said outer case.

4. The solenoid coil assembly as in claim 1, wherein said staking member is a pair of staking members positioned on an engagement surface of said second end of said spool assembly, said pair of staking members being positioned and configured to pass through a corresponding pair of openings in said outer case.

5. The solenoid coil assembly as in claim 1, wherein said central opening is configured to receive and engage a portion of a valve assembly, wherein a portion of a magnetic circuit of the solenoid coil assembly is integrated into said portion of said valve assembly.

6. The solenoid coil assembly as in claim 1, further comprising:

f) a movable member protruding inwardly from said outer case, said movable member providing an interference engagement of said spool assembly within said outer case, after said spool assembly has been inserted therein.

7. The solenoid coil assembly as in claim 1, wherein a portion of the inner surface of said outer case is configured to have a plurality of grooves for mating with a plurality of protrusions on a valve assembly.

8. A coil assembly as in claim 1, wherein said outer case is made out of ferromagnetic material and said spool assembly is constructed out of plastic.

9. A solenoid coil assembly comprising:

a spool configured for receiving a coil winding and having a pair of terminals electrically connected to said coil winding, said pair of terminals depending outwardly from one end of said spool, said spool being configured to be received and engaged in an outer case, said outer case having a complimentary pair of openings configured for allowing a portion of said terminals to pass therethrough; and a locating aperture positioned on another end of said spool, said locating aperture being positioned to receive a locating pin on a coil supporting fixture, said locating pin properly locates said spool on said coil supporting fixture, said coil supporting fixture aligning said pair of terminals with said pair of openings in a circuit board allowing said pair of terminals to be linearly inserted into said pair of openings in said circuit board.

10. The solenoid coil assembly as in claim 9, wherein said spool is heat staked to said outer case before said pair of terminals are inserted into said circuit board.

11. The solenoid coil assembly as in claim 9, wherein said outer case includes a retaining feature for retaining said spool in said outer case after said spool is inserted therein.

12. The solenoid coil assembly as in claim 11, wherein said spool is heat staked to said outer case before said pair of terminals are inserted into said circuit board.

13. The solenoid coil assembly as in claim 10, wherein an independent valve assembly is inserted into said outer case after said spool is heat staked to said outer case and after said pair of terminals are secured to said circuit board.

14. The solenoid coil assembly as in claim 13, wherein a portion of a magnetic circuit of the solenoid coil assembly is integrated into a valve flange portion of said independent valve assembly wherein flux losses of the magnetic circuit are reduced.

15. The solenoid coil assembly as in claim 9, wherein a pair of locating apertures are angularly positioned on said spool, said pair of locating apertures are positioned to receive and engage a pair of locating pins on said coil supporting fixture, wherein the angular location of said pair of locating pins aligns said pair of terminals with said pair of openings in said circuit board.

16. The solenoid coil assembly as in claim 9, wherein said outer case is adapted to flex outwardly as said spool is inserted in said outer housing.

17. The solenoid coil assembly as in claim 9, wherein said spool comprises a means for allowing the securement of said pair of terminals to said coil winding.

18. The solenoid coil assembly as in claim 9, wherein said solenoid coil assembly is configured to provide direct contact between said another end of said spool and a portion of a flange of a value assembly, said portion of said flange being received with said outer case and comprises a portion of a magnetic circuit for manipulating a plunger of said valve assembly.

19. A solenoid coil assembly comprising:

a spool assembly configured for receiving a coil winding between a guide end and a securement end of said spool assembly, said spool assembly further comprising a pair of terminals electrically connected to said coil winding and depending outwardly from said securement end, said spool assembly having an inner through opening configured for receiving a portion of a valve assembly and said spool assembly being configured to be received and engaged in an outer case, said outer case having a complimentary pair of openings configured for allowing a portion of said pair of terminals to pass therethrough;

a locating aperture positioned on said guide end of said spool assembly, said locating aperture being positioned to receive a locating pin on a coil supporting fixture, said locating pin properly locates said spool on said coil supporting fixture, said coil supporting fixture aligning said pair of terminals with said pair of openings in a circuit board allowing said pair of terminals to be linearly inserted into said pair of openings in said circuit board; and wherein said guide end and said outer housing define a receiving area configured to receive a flange portion of said valve assembly.

20. The solenoid coil assembly as in claim 19, wherein said receiving area is also configured to receive a portion of said coil supporting fixture containing said locating pin.

21. The solenoid coil assembly as in claim 19, wherein said flange portion is in direct contact with said guide end and completes a portion of a magnetic circuit of said solenoid coil assembly.

22. The solenoid coil assembly as in claim 19, wherein said receiving area comprises a plurality of features for engaging complimentary features of said flange portion.

* * * * *